United States Patent [19]

Kato et al.

[11] Patent Number: 4,676,582
[45] Date of Patent: Jun. 30, 1987

[54] RADIATION IMAGE READ-OUT AND REPRODUCING APPARATUS

[75] Inventors: Hisatoyo Kato; Yasuhiro Kawai; Yuji Ohara; Yoshihiko Okamoto; Yutaka Taniguchi; Kazuo Horikawa, all of Kanagawa, Japan

[73] Assignee: Fuji Photo Film Co., Ltd., Kanagawa, Japan

[21] Appl. No.: 556,232
[22] PCT Filed: Feb. 18, 1983
[86] PCT No.: PCT/JP83/00047
§ 371 Date: Oct. 18, 1983
§ 102(e) Date: Oct. 18, 1983
[87] PCT Pub. No.: WO83/03012
PCT Pub. Date: Sep. 1, 1983

[30] Foreign Application Priority Data

Feb. 18, 1982 [JP] Japan .................................. 57-24795

[51] Int. Cl.⁴ ............................................. G02B 26/10
[52] U.S. Cl. ................................. 350/6.5; 250/484.1; 250/337
[58] Field of Search .................... 350/6.5, 44, 45; 250/337, 484.1; 353/61

[56] References Cited

U.S. PATENT DOCUMENTS

| 3,443,110 | 5/1969 | Kelsall | 350/6.5 |
| 4,057,351 | 11/1977 | Fomenko | 350/6.5 |
| 4,180,307 | 12/1979 | Tateoka et al. | 350/6.5 |
| 4,343,531 | 8/1982 | Tateoka et al. | 350/6.5 |
| 4,484,073 | 11/1984 | Ohara et al. | 250/337 |
| 4,498,006 | 2/1985 | Horikawa et al. | 250/484.1 |

Primary Examiner—John K. Corbin
Assistant Examiner—Loha Ben
Attorney, Agent, or Firm—Sughrue, Mion, Zinn, Macpeak, and Seas

[57] ABSTRACT

A radiation image reader/recorder which mainly scans an optical beam (2, 22) emitted from the optical beam generation means of a laser light source (1, 21) via a light deflector (4, 25) with a frequency less than a main scanning frequency of 1 KHz, and which sub-scans at a sub-scanning density of more than 2.5 lines/mm, reading or recording a radiation image of continuous halftones. A cover (11, 29) is provided over at least at the optical passage between the means (1, 21) and the deflector (4, 25), thereby preventing the flow of air.

5 Claims, 2 Drawing Figures

RADIATION IMAGE READ-OUT AND REPRODUCING APPARATUS

TECHNICAL FIELD

This invention relates to a radiation image read-out and reproducing apparatus for conducting read-out or reproducing of a radiation image by two-dimensionally scanning a recording medium with a light beam such as a laser beam.

BACKGROUND ART

It is well known that pitch ununiformity constitutes a significant factor adversely affecting the quality of a scanning line image obtained by modulating and deflecting a light beam such as a laser beam and forming scanning lines of the light beam on a light-sensitive material to record the image thereon. By "pitch ununiformity" is meant a stripe pattern visually appearing in an image formed by scanning lines of a light beam due to ununiform intervals among the scanning lines in a portion of the image wherein the intervals among the scanning lines are not uniform. As the causes for pitch ununiformity, two problems with regard to the apparatus have heretofore been known. One is the feed ununiformity in sub-scanning as described, for example, in the paper entitled "Problems in Sub-scanning in Cylinder Type Facsimilie" in National Technical Report, Vol. 22, No. 5, Oct. 1976, pages 55 to 558. The other is the face inclination of a light deflector as described, for example, in the paper entitled "System for Correcting Scanning Line Pitch Ununiformity in Multi-face Rotating Mirror Facsimile Scanning" in Gazo Denshi Gakkaishi (Image Electronics Society Magazine), Vol. 5, No. 3, 1976, pages 107 to 113.

However, the inventors found that, when main scanning is conducted at a relatively low speed of 1 kHz or less since the amount of the image information is enormous and sub-scanning is conducted at a high scanning density of 2.5 lines/mm or more and when an attempt is made to conduct read-out or reproducing of a half-tone radiation image at a high accuracy by point-by-point scanning, pitch ununiformity still occurs even if the aforesaid causes for pitch ununiformity, i.e. the sub-scanning feed ununiformity and the face inclination of the light deflector are eliminated completely. (When pitch ununiformity occurs at the time of image read-out, pitch ununiformity also occurs in the image reproduced from the read-out image.) A radiation image used for medical diagnosis must have a quality allowing accurate diagnosis. Namely, the radiation image must have a quality suitable for viewing, particularly for diagnostic purposes. However, when pitch ununiformity is generated in the radiation image, it becomes impossible to accurately conduct diagnosis and, in the worst case, there is a risk of the radiation image being diagnosed erroneously.

The inventors conducted various experiments to eliminate pitch ununiformity generated by a third cause other than the two causes described abouve when reading out and reproducing a half-tone radiation image at a high accuracy, and found that the third cause is an air stream generated in the optical path of the light beam between a laser beam source and a medium for read-out or reproducing. Namely, when an air stream is generated in the optical path of the light beam, the air density becomes ununiform and, therefore, the refractive index is changed slightly. As a result, the light beam is subjected to refraction, and pitch ununiformity is generated on the surface scanned with the light beam.

Causes for the generation of the air stream involve heat convection due to heat generated by a light beam generating means, and air vibrations due to a cooling fan for cooling the light beam generating means. Since the swinging frequency of the air stream is within the range of several tens of hertz or less, the air stream adversely affects the radiation image read-out and reproducing wherein the main scanning is conducted at a relatively low speed of 1 kHz or less as described above.

The object of the present invention is to provide a radiation image read-out and reproducing apparatus which prevents an air stream from being generated in the optical path of a light beam and conducts read-out or reproducing of a radiation image suitable for viewing, particualrly for diagnostic purposes without generating pitch ununiformity.

DISCLOSURE OF INVENTION

The present invention provides a radiation image read-out and reproducing apparatus for conducting read-out or reproducing of a radiation image of continuous gradation and comprising a light beam generating means, a light deflector for scanning with a light beam generated by said light beam generating means in a main scanning direction at a main scanning frequency of 1 kHz or less, and a sub-scanning means for conducting sub-scanning at a sub-scanning density of 2.5 lines/mm or more, wherein the improvement comprises the provision of a cover for preventing an air stream from occurring at least on an optical path between said light beam generating means and said light deflector.

In the present invention, it is possible to obtain a radiation image exhibitiong no pitch error and suitable for viewing, particularly for diagnostic purposes by use of the radiation image read-out and reproducing apparatus wherein main scanning is conducted at a relatively low speed of 1 kHz or less and sub-scanning is conducted at a high scanning density of 2.5 lines/mm or more, thereby to conduct read-out or reproducing of a half-tone readiation image at a high accuracy.

The radiation image read-out and reproducing apparatus in accordance with the present invention may be of the type for conducting read-out wherein a sheet carrying a radiation image consisting of a density pattern recorded therein is two-dimensionally scanned with a light beam, and the reflected light (when the sheet is not permeable to the light beam) or the transmitted light (when the sheet is permeable to the light beam) obtained by the scanning is received by a photodetector such as a photomultiplier, thereby to read out the radiation image recorded in the sheet. Or, the radiation image read-out and reproducing apparatus may be of the type used in a radiation image system using a stimulable phosphor sheet as described in U.S. Pat. No. 4,258,264 and Japanese Unexamined Patent Publication No. 56(1981)-11395 wherein a stimulable phosphor sheet is first exposed to a radiation such as X-rays passing through an object such as a human body to have a radiation image stored therein, the stimulable phosphor sheet carrying the radiation image therein is then two-dimensionally scanned with stimulating rays such as a laser beam which causes the stumulable phosphor sheet to emit light in proportion to the radiation energy stored therein, and the emitted light is photoelectrically detected and converted to an electric image signal by use of a photomultiplier, thereby to read out the radiation image.

Alternatively, the radiation image read-out and reproducing apparatus in accordance with the present invention may be of the type for conducting image reproducing wherein a recording medium such as a photographic light-sensitive material is scanned with a light beam two-dimensionally modulated according to the radiation image information, thereby to form a radiation image on the recording medium.

In the present invention, the cover for preventing an air stream from occurring may be positioned between a recording medium on which read-out or reproducing is conducted and a light beam generating means. However, the experiments conducted by the inventors revealed that, when a cover is positioned at a portion wherein the light beam is not deflected, i.e. on the optical path between the light beam generating means and the light deflector, it is possible to significantly prevent pitch ununiformity from occurring due to an air stream. Thus, it is not necessarily required to position the cover at a portion wherein the light beam is deflected.

Further, the effect of preventing an air stream from occurring due to heat can be obtained also by positioning only a horizontal cover without installing a vertical cover.

BEST MODE OF CARRYING OUT THE INVENTION

Figure 1:
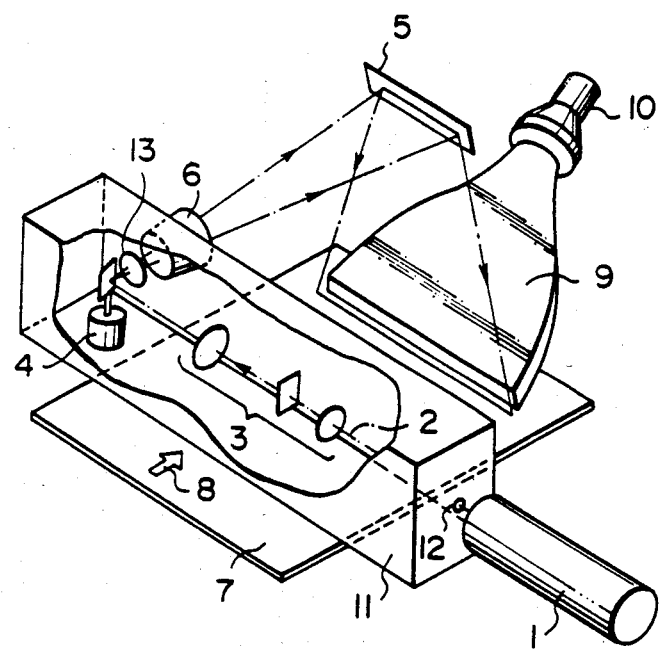
FIG. 1 is a schematic perspective view showing an embodiment of the radiation image read-out and reproducing apparatus in accordance with the present invention.

The present invention will hereinbelow be described in further detail with reference to the accompanying drawings. FIG. 1 is a schematic perspective view showing an embodiment of the apparatus in accordance with the present invention, i.e. a radiation image read-out apparatus for reading out a radiation image from a stimulable phosphor sheet.

In this embodiment, read-out is conducted as described below.

A laser beam 2 emitted from a laser beam source 1 is passed through a collimating system 3 for strictly adjusting the beam diameter of the laser beam 2. The laser beam 2 is then deflected by a light deflector 4 such as a galvanometer mirror, and directed onto a stimulable phosphor sheet 7 by a plane reflection mirror 5. The laser beam source 1 is selected so that the laser beam 2 emitted therefrom has a wavelength distribution different from and far apart from the wavelength distribution of the light emitted from the stimulable phosphor sheet 7 upon stimulation thereof. Between the light deflector 4 and the plane reflection mirror 5 is positioned an $f\theta$ lens 6, so that the stimulable phosphor sheet 7 is scanned with the laser beam 2 at a predetermined speed. While the laser beam 2 impinges upon the stimulable phosphor sheet 7, the phosphor sheet 7 is moved in the direction of the arrow 8 to conduct sub-scanning and, consequently, the whole area of the phosphor sheet 7 is exposed to the laser beam 2. Upon exposure to the laser beam 2, the stimulable phosphor sheet 7 emits light in proportion to the X-ray energy stored therein, and the emitted light enters a light guiding sheet 9. The light guiding sheet 9 has a linear light input face positioned close to the scanning line on the stimulable phosphor sheet 7, and a ring-shaped light output face in close contact with the light receiving face of a photodetector 10, which may be a photomultiplier. The light guiding sheet 9 is made of a transparent thermoplastic resin such as an acrylic resin sheet so that the light entering from the light input face can be transmitted to the light output face by total reflection through the interior of the light guiding sheet 9. The light emitted from the stimulable phosphor sheet 7 upon stimulation thereof is guided in the interior of the light guiding sheet 9, emitted from the light output face of the light guiding sheet 9, and received by the photodetector 10. The light guiding sheet 9 may be of a shape and a material as disclosed in U.S. Pat. No. 4,346,295. The light receiving face of the photodetector 10 is provided with a filter for transmitting only the light having the wavelength distribution of the light emitted from the stimulable phosphor sheet 7 and cutting off the light having the wavelength distribution of the stimulating rays, so that the photodetector 10 can detect only the light emitted from the stimulable phosphor sheet 7 upon stimulation thereof. The output of the photodetector 10 is subjected to processings such as amplification and calculation, and then outputted as a visual image by an output unit.

A cover 11 from preventing an air stream from occurring has a box-like shape having six side faces and is provided with a laser beam inlet opening 12 and a laser beam outlet opening 13. The cover 11 is positioned to incorporate therein the optical system wherein the laser beam 2 advances in a straight line between the laser beam outlet of the laser beam source 1 and the light deflector 4. The cover 11 prevents an air stream from being generated due to heat generated by the laser beam source 1 or due to air vibrations generated by a cooling fan, thereby to prevent pitch ununiformity from being generated.

The volume formed by the cover 11 should preferably be as small as possible in order to prevent air convection from being generated in the cover 11.

Also when a radiation image stored as a density pattern in a sheet impermeable to light is read out therefrom based on the reflected light, image read-out can be conducted in the same manner as in the embodiment described above. In this case, however, there is no particular limit to the wavelength distribution of the laser beam, and it is not necessary to use the cut filter for cutting off the light emitted from the stimulable phosphor sheet upon stimulation thereof.

Further, when a radiation image stored as a density pattern in a sheet permeable to light is read out therefrom based on the transmitted light, the light input face of the light guiding sheet should be positioned along the scanning lines on the sheet on the side opposite to the laser beam source.

Figure 2:
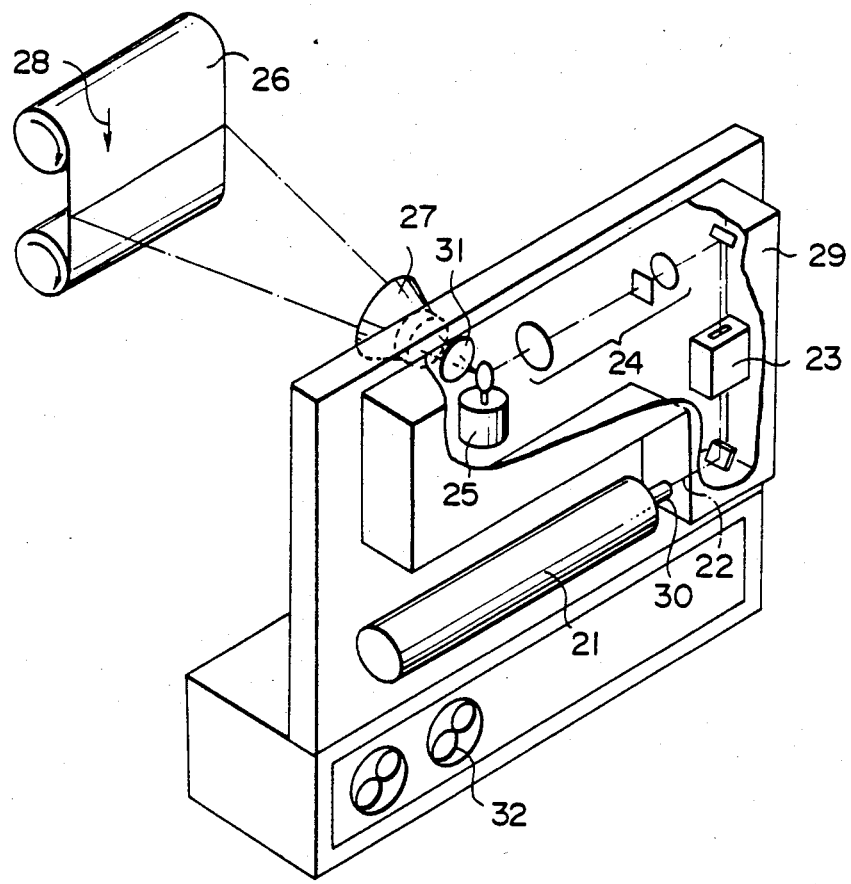
FIG. 2 is a schematic perspective view showing another embodiment of the apparatus in accordance with the present invention.

FIG. 2 is a schematic perspective view showing another embodiment of the apparatus in accordance with the present invention, i.e. a radiation image reproducing apparatus for reproducing image in a recording medium such as a photographic light-sensitive material.

In this embodiment, image reproducing is conducted as described below.

A laser beam 22 emitted from a laser beam source 21 is modulated by a light modulator 23 according to the radiation image signals outputted. The laser beam 22 is then passed through a collimating system 24 for strictly adjusting the beam diameter of the laer beam 22. Thereafter, the laser beam 22 is deflected by a light deflector 25 such as a galvanometer mirror, and directed onto a recording medium 26 such as a photographic light-sensitive material. Between the light deflector 25 and the recording medium 26 is positioned an fθ lens 27, so that the recording medium 26 is scanned with the laser beam 22 at a predetermined speed. While the laser beam 22 impinges upon the recording medium 26, the recording medium 26 is moved in the direction of the arrow 28 to conduct sub-scanning and, consequently, the whole area of the recording medium 26 is exposed to the laser beam 22 to reproduce the radiation image therein.

A cover 29 for preventing an air stream from being generated is in the form of an L-shaped box having a laser beam inlet opening 30 (in this embodiment, the laser beam inlet opening 30 is closely contacted with the laser beam source 21 via a small-diameter tube member) and a laser beam outlet opening 31. The cover 29 is positioned to incorporate therein the optical system wherein the laser beam 22 advances in a straight line between the laser beam outlet of the laser beam source 21 and the light deflector 25. The cover 29 prevents an air stream from being generated due to heat generated by the laser beam source 21 or due to air vibrations generated by a cooling fan 32, thereby to prevent pitch ununiformity from being generated.

In the embodiments described above, the covers 11 and 29 are formed so as to contain therein the light deflectors 4 and 25, respectively. However, it is also possible to form the covers 11 and 29 so that they do not contain the light deflectors 4 and 25.

Also in the embodiment of FIG. 2, the volume formed by the cover 29 should preferably by as small as possible in order to prevent air convection from being generated in the cover 29.

In the embodiments described above, the cover has the laser beam inlet opening and the laser outlet opening. However, the cover may be of a totally enclosed construction having members permeable to light provided at the laser beam inlet and outlet. Further, the inside of the totally enclosed construction may be evacuated to a vacuum in order to further securely prevent an air stream from being generated.

Further, when an air stream is caused mainly by heat convection, the same effect can be obtained also by positioning only a horizontal cover without positioning a vertical cover. It is advantageous that the cover be transparent since, in this case, the internal optical system can be observed without removing the cover. The cover may be made of any material insofar as an air stream can be prevented from being generated. However, the cover should preferably be made of a material exhibiting excellent heat insulating properties, such as a plastic material. For example, a transparent plastic material such as polyvinyl chloride is suitable as the material for the cover.

INDUSTRIAL APPLICABILITY

As described above, in the present invention, it is possible to prevent pitch error due to an air stream from being generated and to obtain a radiation image suitable for viewing, particularly for diagnostic purposes in a radiation image read-out and reproducing apparatus wherein main scanning with a light beam is conducted at a main scanning frequency of 1 kHz or less and sub-scanning is conducted at a sub-scanning density of 2.5 lines/mm or more, thereby to conduct read-out or reproducing of a radiation image of continuous gradation.

We claim:

1. A radiation image read-out and reproducing apparatus for conducting read-out or reproducing of a radiation image of continuous gradation and comprising; a light beam generating means, a light deflector for scanning with a light beam generated by said light beam generating menas in a main scanning direction at a main scanning frequency of 1 kHz or less, an sub-scanning means for conducting sub-scanning at a sub-scanning density of 2.5 lines/mm or more, and a cover for preventing an air stream from occurring at least on an optical path between said light beam generating means and said light deflector.

2. A radiation image read-out and reproducing apparatus for conducting read-out according to claim 1 wherein said cover encloses said deflector and has a laser beam inlet opening and a laser beam outlet opening.

3. An apparatus for conducting read-out according to claim 1 wherein said cover comprises a horizontal cover sheet partially enclosing said light beam.

4. An apparatus for conducting read-out according to claim 1 wherein said cover totally encloses said light beam and has light permeable members for permitting the laser beam to pass through said cover.

5. An apparatus for conducting read-out according to claim 4, wherein said cover is evacuated to a vacuum in order to prevent an air stream from being generated.

* * * * *